(12) United States Patent
Lee

(10) Patent No.: US 6,524,006 B1
(45) Date of Patent: Feb. 25, 2003

(54) FLUID DYNAMIC BEARING ASSEMBLY

(75) Inventor: Chen-hsiung Lee, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/547,916

(22) Filed: Apr. 11, 2000

(51) Int. Cl.[7] .............................................. F16C 32/06
(52) U.S. Cl. ...................................... 384/107; 384/112
(58) Field of Search ............................... 384/100, 107, 384/111, 112, 113, 114, 115, 118, 119, 120, 121, 123

(56) References Cited

U.S. PATENT DOCUMENTS

| 5,433,529 A | * | 7/1995 | Hensel ........................ 384/112 |
| 5,457,588 A | | 10/1995 | Hattori et al. ............ 360/99.08 |
| 5,487,608 A | | 1/1996 | Leuthold et al. ............ 384/113 |
| 5,499,901 A | | 3/1996 | Rockwood .................. 415/111 |
| 5,516,212 A | | 5/1996 | Titcomb ..................... 384/107 |
| 5,579,579 A | | 12/1996 | Chen ............................ 29/898 |
| 5,647,672 A | | 7/1997 | Fututani ..................... 384/100 |
| 5,683,183 A | | 11/1997 | Tanaka et al. .............. 384/100 |
| 5,685,647 A | | 11/1997 | Leuthold et al. ............ 384/113 |
| 5,707,154 A | | 1/1998 | Ichiyama .................... 384/107 |
| 5,710,678 A | | 1/1998 | Leuthold et al. ......... 360/99.08 |
| 5,715,116 A | | 2/1998 | Moritan et al. .......... 360/99.08 |
| 5,716,141 A | | 2/1998 | Chen .......................... 384/114 |
| 5,806,987 A | * | 9/1998 | Nose et al. ................. 384/100 |
| 5,822,846 A | | 10/1998 | Moritan et al. ............... 29/598 |
| 6,066,903 A | * | 5/2000 | Ichiyama ............... 384/107 X |

FOREIGN PATENT DOCUMENTS

| JP | 59-127586 | 6/1984 |
| JP | 64-140203 | 5/1989 |
| JP | 96-174201 | 6/1996 |

* cited by examiner

Primary Examiner—Thomas R. Hannon
(74) Attorney, Agent, or Firm—Ohlandt, Greeley, Ruggiero & Perle, L.L.P.; Robert B. Martin

(57) ABSTRACT

There is provided a disk drive motor including a shaft, a thrust plate, a bearing housing positioned about the shaft, and a combination of groove sets on either the shaft or the bearing housing. The asymmetrical grooves are oriented to pump fluid in a specific direction during rotation of the housing around the shaft. Vents are also positioned to allow unwanted gases to escape.

14 Claims, 2 Drawing Sheets

FLUID DYNAMIC BEARING ASSEMBLY

FIELD OF THE INVENTION

This invention relates in general to fluid dynamic bearing assemblies. More particularly, this invention relates to disk drive motors that use fluid dynamic bearing assemblies.

BACKGROUND OF THE INVENTION

In a typical magnetic disk drive, a motor rotates a magnetic disk at high speed while a transducing head uses air pressure to "fly" over the top surface of the disk, which is divided into a plurality of tracks. By moving the transducing head radially across the surface of the disk, the transducing head can read information from or write information to the different tracks. The faster the disk can rotate, the faster the transducing head can read and write information.

Originally, disk drive motors used standard ball bearings between a shaft and a hub. However, motors having ball bearings were known to experience problems such as vibrations that prevented information from being correctly stored and quickly accessed. This was especially true as advancements in data storage technology increased both magnetic disk storage densities and rotation speed. Fluid dynamic bearings have been proposed and used to overcome the problems associated with ball bearings. Fluid dynamic bearings are shown in U.S. Pat. No. 5,427,546 to Hensel, U.S. Pat. No. 5,516,212 to Titcomb, and U.S. Pat. No. 5,707,154 to Ichiyama.

Currently, an exemplary disk drive motor typically includes a stationary shaft on which is mounted a rotatable bearing housing. The bearing housing is secured to one or more magnetic disks. A pattern of grooves is defined on the exterior surface of the shaft or the interior surface of the bearing housing. There is no direct contact between the bearing housing and the shaft. Instead, a lubricating fluid, such as oil, is placed between the shaft and the bearing housing. Rotation of the bearing housing causes a build up of pressure in the lubricating fluid. This fluid pressure aids in forming and maintaining a fluid dynamic bearing between the shaft and the bearing housing.

Fluid dynamic bearings have advantages when applied to disk drive motors. For example, fluid dynamic bearings are generally quiet and have good run out characteristics. Also, fluid dynamic bearings occupy less space than either ball bearings or air bearings. However, fluid dynamic bearings also have disadvantages. For example, they consume more power than ball bearings or air bearings. More significantly, fluid leakage can be a problem that ultimately leads to oil "starvation," which results in increased wear and premature failure of the disk drive motor.

In an attempt to prevent leakage, the groove patterns within each fluid dynamic bearing may be designed to produce a neutral pumping action so that no fluid loss occurs in any direction.during rotation. In addition, fluid is sealed within the disk drive motor by surface-tension seals at the fluid/air interfaces and by labyrinth seals between the shaft and the bearing housing.

Yet, due to the difficulty of precisely aligning each of the grooves, it is unlikely that a fluid dynamic bearing can actually be produced in such a way that a neutral pumping is created. More significantly, surface-tension seals are very vulnerable to fluid leakage caused by centrifugal forces at high rotational speeds. Furthermore, surface-tension seals may experience blowout arising from cavitation and escaping, unwanted gases.

Unwanted gases may be entrapped in the closed space formed when the shaft is inserted into the bearing housing and, thus, affect the quality of the disk drive motor. Initial confinement of unwanted gases may be reduced by completely filling the gap between the shaft and the housing with lubricating fluid. Yet, completely filling the gap between the shaft and the housing requires filling in the vacuum, which is not cost effective.

In addition, unwanted gases can be ingested by the disk drive motor during operation, especially at high rotational speeds. The unwanted gases may expand in response to low external ambient pressure or high temperature conditions and displace the lubricating fluid within the fluid dynamic bearing, thus, adversely affecting the disk drive motor.

Venting of unwanted gases is necessary to prevent displacement of the lubricating fluid. Typically, a venting hole is provided to vent the unwanted gases through a hollow canter opening in the shaft. While placing a vent within the shaft has become a common partial-solution to the problem of gas entrapment and ingestion, fluid leakage has not been prohibited. Without a reasonable solution to the joint problems of unwanted gases and fluid leakage, one is obliged either to accept shorter useful life spans for disk drive motors or resort to large fluid reservoirs. Regardless, without a solution, the rotational speeds of disk drive motors cannot be greatly increased.

SUMMARY OF THE INVENTION

In order to solve the problems discussed above, the present invention provides a fluid dynamic bearing assembly particularly for a disk drive motor.

Accordingly, the disk drive motor includes a shaft, a thrust plate, a bearing housing positioned about the shaft, and a combination of grooves on either the shaft or the bearing housing. The grooves are, oriented to pump fluid in a specific direction when the bearing housing relatively rotates around the shaft. Vents are also positioned to allow unwanted gases to escape.

DESCRIPTION OF THE INVENTION

Figure 1:
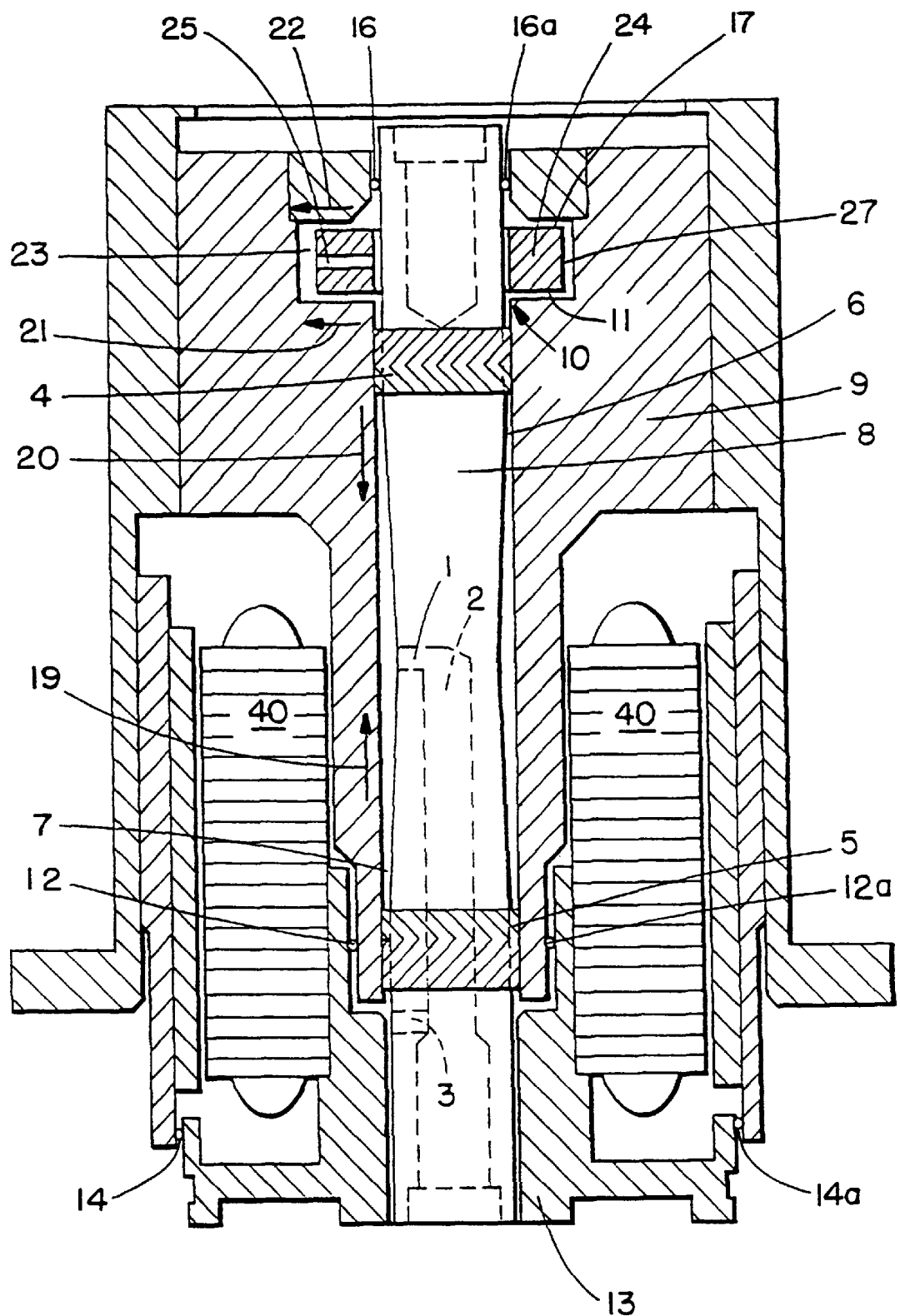
FIG. 1 illustrates a disk drive motor according to the present invention.

FIG. 1 illustrates an embodiment of the present invention. A bearing housing 9 is mounted around a shaft 8. Bearing housing 9 and shaft 8 are not in direct contact. Instead, there is a clearance between them that is preferably at least partially filled with one or more lubricating fluids, such as an oil. The oil may be natural, such as those derived from animals, vegetables, minerals, and petroleum sources, or may be synthetic. The oil is contained in reservoirs 6 and 7. Preferably, reservoirs 6 and 7 are separated, or decoupled.

Shaft 8 includes an annular thrust plate 24 that includes a pair of annular surfaces 11 and 17 oriented substantially perpendicularly to shaft 8. Annular surfaces 11 and 17 are spaced apart by a rim surface 27 that is oriented substantially parallel to shaft 8. All the elements of the disk drive motor are mounted on a base plate 13, which is typically sealed by labyrinth seals 14 and 14a to prevent contamination.

Sets of grooves, identified generally as 4 and 5, are located on either shaft 8 or bearing housing 9.

Figure 2:
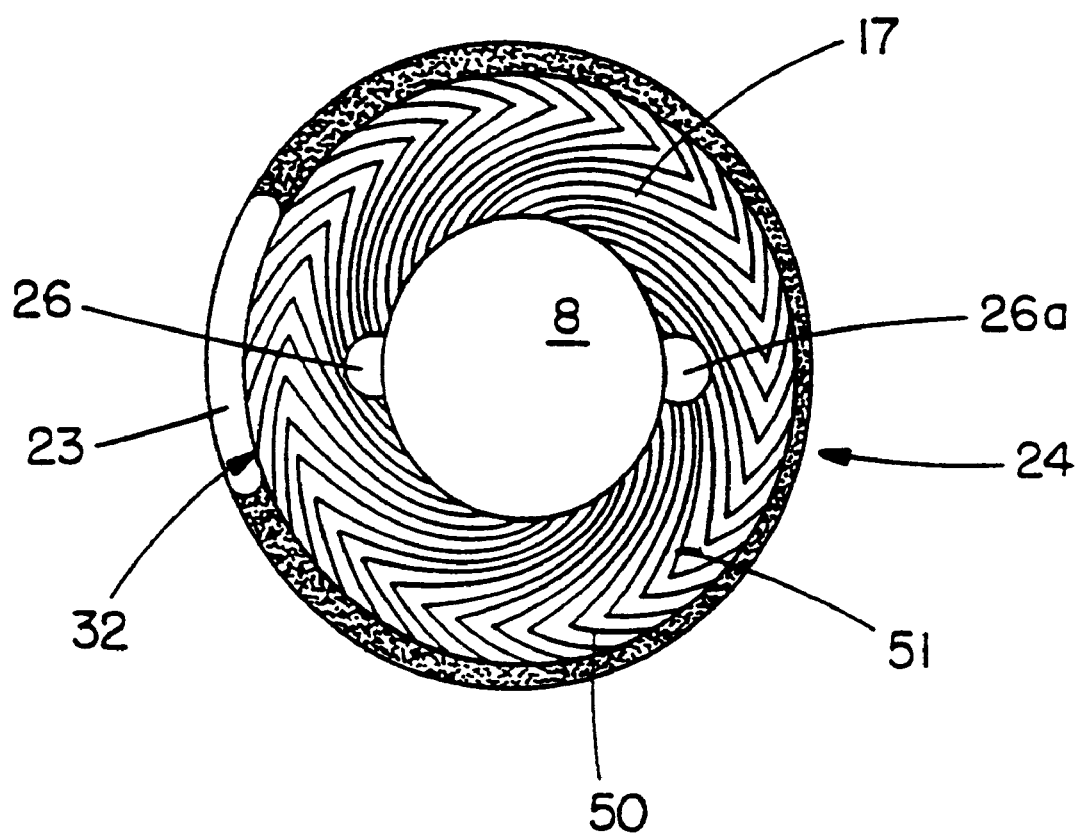
FIG. 2 is a top down view of the thrust plate on the shaft in the disk drive motor of FIG. 1.

Groove sets 31 (not shown, but similar in configuration to set 32, see FIG. 2) and 32 are located on either (i) annular surfaces 11 and 17, respectively, of thrust plate 24 or (ii) bearing housing 9 adjacent to annular surfaces 11 and 17. Preferably, groove sets 4 and 5 have separate reservoirs of fluid, although they need not. Groove sets 31 and 32 preferably share reservoir 6 with groove set 4.

Each groove within a groove set preferably consists of at least two legs 50 and 51 (see FIG. 2), which form an asymmetrical "V"-shape. However, the grooves may have any other pattern, such as a U-shape or a spiral shape, which produces the pumping action as described below.

Leg 50 is shorter than leg 51. Preferably, the ratio of the length of leg 50 to leg 51 is about 0.5:1 to about 1:1. Most preferably, the ratio of the length of leg 50 to leg 51 is about 0.8:1. In sets 4 and 5 (see FIG. 1), the short legs are oriented toward the middle of shaft 8 and towards vent 1. In sets 31 and 32 (see FIG. 2), the short legs are oriented toward the annular rim of thrust plate 24.

Several vents are provided to release unwanted gases entrapped within or ingested by the lubricating fluid. The vents also serve to enable air to flow into the space between groove sets and to equalize the pressure at both sides of a groove set. First, vent 1 is provided to vent unwanted gases from between reservoirs 6 and 7 into the hollow center opening 2 in shaft 8. The unwanted gases may then escape via vent 3 and past labyrinth seals 12 and 12a, respectively. Vents 1,3 also keep the pressure between reservoirs 6 and 7 equal to the ambient pressure. Vent 1 may extend radially across one or both sides of shaft 8. Second, vents 26 and 26a (see FIG. 2) are provided to vent unwanted gases from space 10, which is formed within reservoir 7 during rotation of bearing housing 9 around shaft 8. The unwanted gases may then escape past labyrinth seals 16 and 16a.

Thrust plate 24 is eccentrically positioned relative to bearing housing 9. Alternatively, bearing housing 9 can be eccentrically positioned relative to thrust plate 24. In either configuration, the gap between thrust plate 24 and bearing housing 9 is larger in one section, referenced generally as 23. Vent 25 opens into section 23 and is provided to vent unwanted gases from section 23 into vent 26 and to keep the pressure within section 23 equal to the ambiant pressure.

At the start-up of the disk drive motor, stator 40 begins to rotate bearing housing 9 around shaft 8 and pressure is built up within the fluid in groove sets 4, 5, 31, and 32. The asymmetrical shape of the grooves of groove sets 4 and 5 results in a flow of fluid in respective pumping directions 20 and 19. The asymmetrical shape of the grooves of groove sets 31 and 32 results in a net flow of fluid in respective pumping directions 21 and 22. The net flow of fluid stops the inward pumping legs and the outward pumping legs have established an equilibrium.

Pumping direction 20, when considered alone, would tend to pull the fluid around thrust plate 24 into reservoir 7. Pumping direction 21 counteracts this tendency by pushing the fluid around thrust plate 24 away from reservoir 7 and into the space between rim surface 27 and bearing housing 9. Temporary gap 10 is created within reservoir 7 due to these competing pumping directions and the inflow of air at ambient pressure via vents 16, 16a and 26, 26a.

Pumping direction 22 is provided, among other reasons, to assure that oil does not flow past labyrinth seals 16 and 16a and contaminate the magnetic disks attached to bearing housing 9.

Moreover, pumping action 19 counteracts the tendency of fluid to leak out of reservoir 7 during operation of the disk drive motor and past labyrinth seals 12 and 12a.

Any unwanted gases originally present in, or created during operation of, the disk drive motor may escape from the areas within the disk drive motor where the venting holes are located. Specifically in reference to groove sets 31 and 32, the asymmetrical nature of thrust plate 24 results in the unwanted gases accumulating in section 23 and escaping through vent 25. Vents 26 and 26a allow unwanted gases to escape from temporary gap 10. Also, vent 1 allows unwanted gases to escape from the gap between shaft 8 and bearing housing 9 below thrust plate 24.

While the preferred embodiments of the present invention have been illustrated in detail, it should be apparent that modifications and adaptations to those embodiments may occur to one skilled it the art without departing from the scope of the present invention as set forth in the following claims.

We claim:

1. A bearing assembly for a disk drive motor including:
a shaft, said shaft having a circumferential surface;
a thrust plate projecting annularly outward from said circumferential surface, said thrust plate having a first annular surface substantially perpendicular to said circumferential surface;
a housing arranged around said shaft and said thrust plate, said housing having a first surface opposing said circumferential surface and forming a first gap therebetween, said housing also having a second surface opposing said annular surface and forming a second gap therebetween, said first gap and second gap being in fluid communication;
a fluid or a combination of fluids located within said first and second gaps for lubricating purposes;
a first set of grooves on at least one of said circumferential surface and said first surface;
a second set of grooves on at least one of said annular surface and said second surface, wherein each of said grooves is shaped so as to have at least one pair of legs, said legs converging to form at least one apex, wherein one of said legs is longer than the other and forms an asymmetry, whereby said pumping action is created by said asymmetry, and said first and second sets of grooves are oriented to create competing first and second pumping actions, respectively, on said fluid when said bearing housing rotates around said shaft, said first pumping action tending to pump said fluid out of said second gap, and said second pumping action counteracting said first pumping action.

2. The assembly of claim 1, wherein said first set of grooves are on said first opposing surface and said second sea of grooves are on said annular surface.

3. The assembly of claim 1, further comprising a third set of grooves on at least one of said circumferential surface and said first opposing surface, said third set of grooves oriented to create a third pumping action on said fluid when said bearing housing rotates around said shaft, said fluid tending to leak out of said first gap, but for the third pumping action.

4. The assembly of claim 1, wherein said thrust plate has a second annular surface substantially perpendicular to said circumferential surface, said second annular surface spaced apart from said first annular surface by a rim surface, wherein said housing has a third surface opposing said second annular surface, said third surface spaced apart from said second annular surface and forming a third gap therebetween, said third gap in fluid communication with said second gap, and wherein there is a fourth set of grooves on at least one of said second annular surface and said third surface, said fourth set of grooves creating a fourth pumping action on said fluid when said bearing housing rotates around said shaft, said fluid tending to leak out of said third gap, but for said fourth pumping action.

5. The assembly of claim 1, wherein said shaft includes at least one vent adapted to allow unwanted gases to pass out of said first gap.

6. The assembly of claim 1, herein said thrust plate includes at least one vent adapted to allow unwanted gases to pass out of said second gap.

7. The assembly of claim 1 wherein said fluid or combination of fluids comprises an oil chosen from the group consisting of: animal oil, vegetable oil, mineral oil, synthetic oil, petroleum oil, and mixtures thereof.

8. A bearing assembly for a disk drive motor including:
a shaft, said shaft having a circumferential surface;
a thrust plate projecting annularly outward from said circumferential surface, said thrust plate having a first annular surface substantially perpendicular to said circumferential surface;
a housing arranged around said shaft and said thrust plate, said housing having a first surface opposing said circumferential surface and forming a first gap therebetween, said housing also having a second surface opposing said annular surface and forming a second gap therebetween, said first gap and second gap being in fluid communication;
a fluid or a combination of fluids located within said first and second gaps for lubricating purposes;
a first set of grooves on at least one of said circumferential surface and said first surface;
a second set of grooves on at least one of said annular surface and said second surface, wherein said thrust plate has a circumferential rim surface, said housing has a fourth surface opposing said circumferential rim surface, said fourth opposing surface positioned eccentrically around said circumferential rim surface and forming a fourth gap therebetween, said fourth gap having a wide section and a narrow section, and said fourth gap being in fluid communication with said second gap, and said first and second sets of grooves are oriented to create competing first and second pumping actions on said fluid when said bearing housing rotates around said shaft, said first pumping action tending to pump said fluid out of said second gap, but for said second pumping action.

9. The assembly of claim 8, wherein said circumferential rim surface has a vent adapted to allow unwanted gases to pass out of said second gap and said fourth gap and to keep the pressure within said second gap equal to the ambient pressure.

10. The assembly of claim 9, wherein said vent opens into said wide section.

11. An improved disk drive motor including:
a shaft, said shaft having a circumferential surface;
a thrust plate projecting annularly outward from said circumferential surface, said thrust plate having a first annular surface spaced apart from a second annular surface by a rim surface, said annular surfaces substantially perpendicular to said circumferential surface, said rim surface substantially parallel to said circumferential surface;
a housing arranged around said shaft and said thrust plate, said housing having a first surface opposing said circumferential surface and forming a first gap therebetween, a second surface opposing said first annular surface and forming a second gap therebetween, and a third surface opposing said second annular surface and forming a third gap therebetween, said first and second gaps being in fluid communication, said second and third gaps being in fluid communication;
a fluid or combination of fluids located within said first, second, and third gaps for lubricating purposes;
at least one vent adapted to allow unwanted gases to pass out of said first gap;
at least one vent adapted to allow unwanted gases to pass out of said second and third gaps;
first and second sets of grooves on at least one of said circumferential surface and said first surface;
a third set of grooves on at least one of said first annular surface and said second surface;
a fourth set of grooves on at least one of said second annular surface and said third surface, whereby
said first and third sets of grooves are oriented to create competing first and second pumping actions on said fluid when said bearing housing rotates around said shaft, said first pumping action tending to draw said fluid away from said second gap, but for said third pumping action,
said second set of grooves oriented to create a second pumping action on said fluid when said bearing housing rotates around said shaft, said fluid tending to leak out of said first gap, but for said second pumping action,
said fourth set of grooves oriented to create a fourth pumping action on said fluid when said bearing housing rotates around said shaft, said fluid tending to leak out of said third gap, and the fourth pumping action counteracting said first pumping action.

12. The disk drive motor of claim 11, wherein each of said grooves are shaped so as to have at least one pair of legs, said legs converging to form at least one apex, wherein one of said legs is longer than the other and forms an asymmetry, whereby said pumping action is created by said asymmetry.

13. The disk drive motor of claims 11, wherein said first and second sets of grooves on said first surface, said third set of grooves is on said first annular surface, and said fourth set of grooves is on said second annular surface.

14. The disk drive motor of claim 11 wherein said fluid is an oil chosen from the group consisting of:
animal oil, vegetable oil, mineral oil, synthetic oil, petroleum oil, and mixtures thereof.

* * * * *